United States Patent
Brake et al.

(10) Patent No.: US 11,017,174 B2
(45) Date of Patent: May 25, 2021

(54) IMPLEMENTING TITLE IDENTIFICATION WITH MISLEADING STATEMENTS

(71) Applicant: International Business Machines Corporation, Armonk, NY (US)

(72) Inventors: Kyle M. Brake, Dublin, OH (US); Stephen A. Boxwell, Franklin, OH (US); Keith G. Frost, Delaware, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 16/181,719

(22) Filed: Nov. 6, 2018

(65) Prior Publication Data

US 2020/0142961 A1 May 7, 2020

(51) Int. Cl.
*G06F 40/30* (2020.01)
*G06F 40/211* (2020.01)
*G06F 40/253* (2020.01)

(52) U.S. Cl.
CPC ............ *G06F 40/30* (2020.01); *G06F 40/211* (2020.01); *G06F 40/253* (2020.01)

(58) Field of Classification Search
USPC ..................................................... 704/1–504
See application file for complete search history.

(56) References Cited

U.S. PATENT DOCUMENTS

| | | | |
|---|---|---|---|
| 8,321,295 B1 * | 11/2012 | Myslinski | G06Q 30/0625 705/26.1 |
| 9,176,957 B2 | 11/2015 | Myslinski | |
| 10,607,253 B1 * | 3/2020 | Shachar | G06Q 30/0244 |
| 2014/0317101 A1 * | 10/2014 | Myslinski | G06F 40/289 707/723 |
| 2016/0188739 A1 | 6/2016 | Tang et al. | |
| 2018/0012236 A1 | 1/2018 | Zhuo et al. | |
| 2018/0365562 A1 * | 12/2018 | Volkova | G06N 3/0445 |
| 2020/0004882 A1 * | 1/2020 | Kulkarni | G06F 16/9535 |
| 2020/0142961 A1 * | 5/2020 | Brake | G06F 40/211 |

OTHER PUBLICATIONS

Prakhar Biyani, A Method and System for Detecting Clickbait Article by using Informality Features in the Article, IP.com https://priorart.ip.com/IPCOM/000249791.
Yimin Chen, 'Misleading Online Content: Recognizing Clickbait as "False News"', ResearchGate https://www.researchgate.net/publication/283721117_Misleading_Online_Content_Recognizing_Clickbait_as_False_News).
Abhijnan Chakraborty,'Stop Clickbait: Detecting and Preventing Clickbaits in Online News Media',IEEE http://cse.iitkgp.ac.in/~abhijnan/papers/chakraborty_clickbait_asonam16.pdf.
Kwebbelkop, "I'm dying :(", YouTube, printed Oct. 30, 2020, 2 pages <https://www.youtube.com/watch?v=toTmVOuDzgw>.

* cited by examiner

*Primary Examiner* — Marcus T Riley
(74) *Attorney, Agent, or Firm* — Jamar K. Ray

(57) ABSTRACT

A method, system and computer program product are provided for implementing misleading title identification. A title and a list of passages are received. The title is supplied to a question answering factoid pipeline as a question. The title is analyzed against the list of passages or content as an answer source material. A respective answer score of all passages is compared with a tunable threshold to identify titles that are misleading or inaccurate based on the content of all passages. A selected action for the identified misleading titles is provided for a user.

16 Claims, 4 Drawing Sheets

IMPLEMENTING TITLE IDENTIFICATION WITH MISLEADING STATEMENTS

FIELD OF THE INVENTION

The present invention relates generally to the data processing field, and more particularly, relates to a method, system and computer program product for implementing title identification with misleading statements in online media.

DESCRIPTION OF THE RELATED ART

Some headlines in online media are more about generating clicks and getting viewers than accurately portraying the information present within an article. Most people tend to not read articles when scrolling through a list of headlines.

A need exists for a mechanism for efficiently and effectively identifying titles with misleading statements, for example, in online media. It is desirable to identify titles that are misleading or inaccurate based on the content of the article.

SUMMARY OF THE INVENTION

Principal aspects of the present invention are to provide a method, system and computer program product for implementing title identification with misleading statements in online media. Other important aspects of the present invention are to provide such method, system and computer program product substantially without negative effects and that overcome many of the disadvantages of prior art arrangements.

In brief, a method, system and computer program product are provided for implementing misleading title identification in an article. A title and a list of passages are received. The title is supplied to a question answering pipeline system as a question. The title is analyzed against the list of passages or content as an answer source material. A respective answer score of all passages is compared with a tunable threshold to identify titles that are misleading or inaccurate based on the content of all passages. A selected action for the identified misleading titles is provided for a user.

In accordance with features of the invention, the question answering pipeline system includes a 0-focus case of a multi-focus factoid pipeline.

In accordance with features of the invention, the title and each of the passages are parsed using an automatic syntactic parser.

In accordance with features of the invention, feature values are identified and applied to an answer scoring model, such as Gaussian Naïve Bayes (Gaussian NB) model.

In accordance with features of the invention, the selected action includes marking the article title as clickbait, optionally flagging by an assigned color, or hiding from a user's view.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized, and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing title identification with misleading statements in an article. A title and a list of passages is received. The title is supplied to a question answering factoid pipeline as a question. The title is analyzed against the list of passages or content as an answer source material to form a title accuracy assessment, for example, by parsing the title and answer source material. For example, an answer score of all passages is compared with a tunable threshold to identify titles that are misleading or inaccurate based on the content. A selected action for the identified misleading titles is provided for a user. The question answering factoid pipeline includes a 0-focus case of a multi-focus factoid pipeline.

Figure 1:
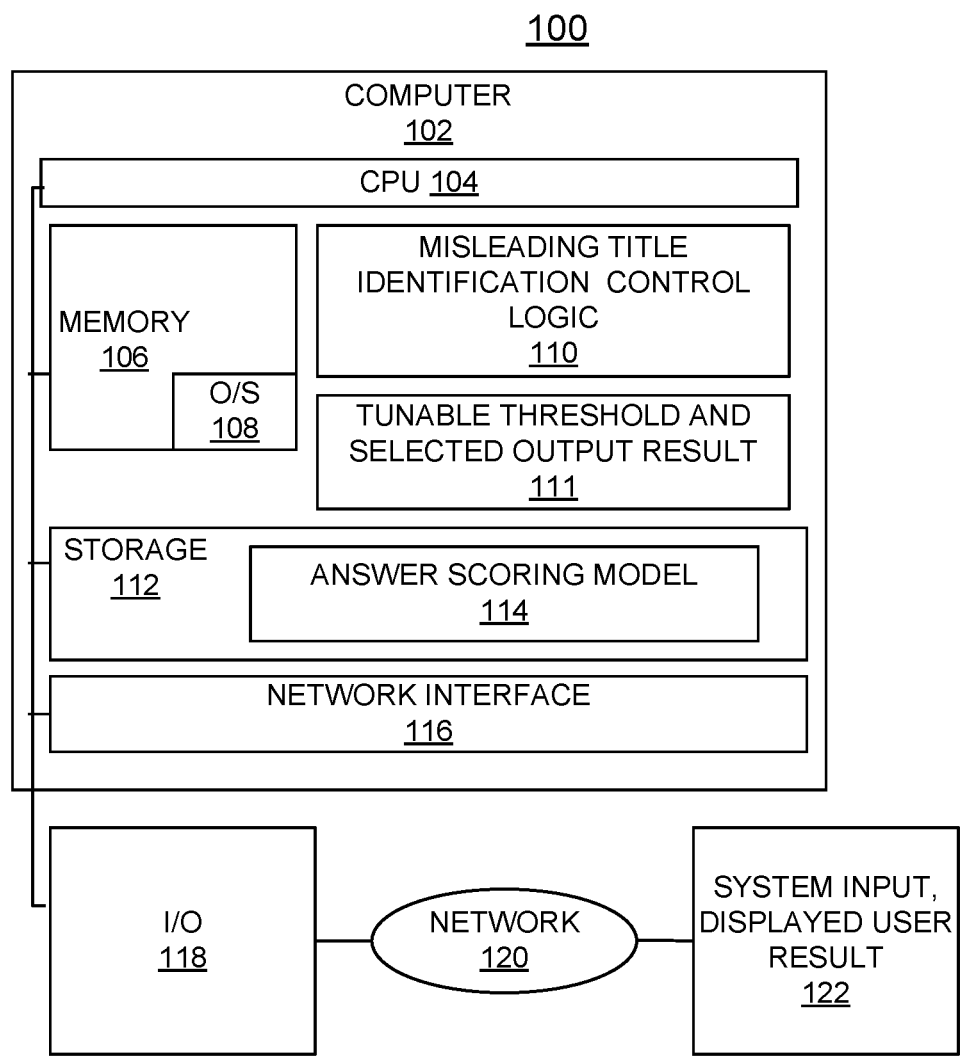
FIG. 1 provides a block diagram of an example computer system for implementing title identification with misleading statements in accordance with preferred embodiments.

Having reference now to the drawings, in FIG. 1, there is shown an example system embodying the present invention generally designated by the reference character 100 for implementing title identification with misleading statements in accordance with preferred embodiments. System 100 includes a computer system 102 including one or more processors 104 or general-purpose programmable central processing units (CPUs) 104. As shown, computer system 102 includes a single CPU 104; however, system 102 can include multiple processors 104 typical of a relatively large system.

Computer system 102 includes a system memory 106 including an operating system 108, a misleading title identification control logic 110 and an adjustable or tunable threshold and selected output result 111 in accordance with preferred embodiments. System memory 106 is a random-access semiconductor memory for storing data, including programs. System memory 106 is comprised of, for example, a dynamic random-access memory (DRAM), a synchronous direct random-access memory (SDRAM), a current double data rate (DDRx) SDRAM, non-volatile memory, optical storage, and other storage devices.

Computer system 102 includes a storage 112 including an answer scoring model 114 in accordance with preferred embodiments and a network interface 116. Computer system 102 includes an I/O interface 118 for transferring data to and from computer system components including CPU 104, memory 106 including the operating system 108, misleading title identification control logic 110, tunable threshold and selected output result 111, storage 112 including answer scoring model 114, and network interface 116, and a network 120 and a client system input, and displayed user result 122.

In accordance with features of the invention, the title identification control logic 110 enables misleading title identification with the adjustable or tunable threshold and selected output result 111 and answer scoring model 114. The title identification control logic 110 presents selected information to a user, such as the online media marked as clickbait or flagged with an assigned color, where green indicated not-clickbait and red indicates clickbait, and intermediate colors represent varying degrees of confidence for the assessment. Also, the online media can be hidden from a user's view for identified clickbait.

Figure 2:
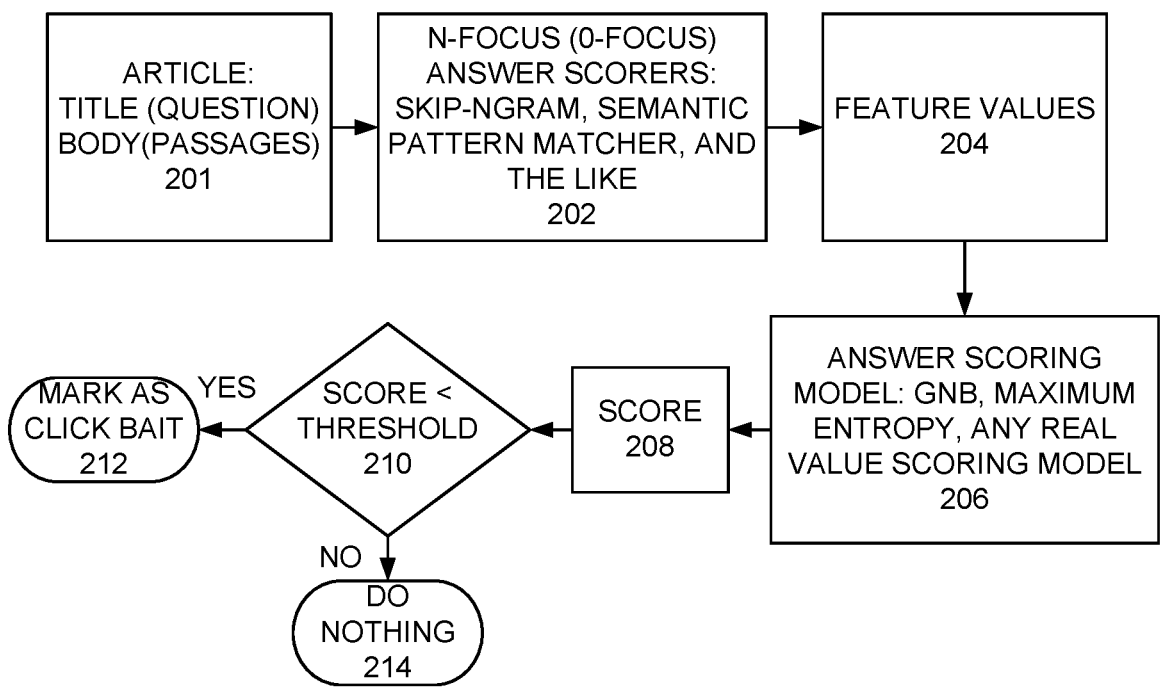
FIGS. 2, and 3 are respective flow chart illustrating example system operations to implement title identification with misleading statements in accordance with preferred embodiments.
Figure 3:
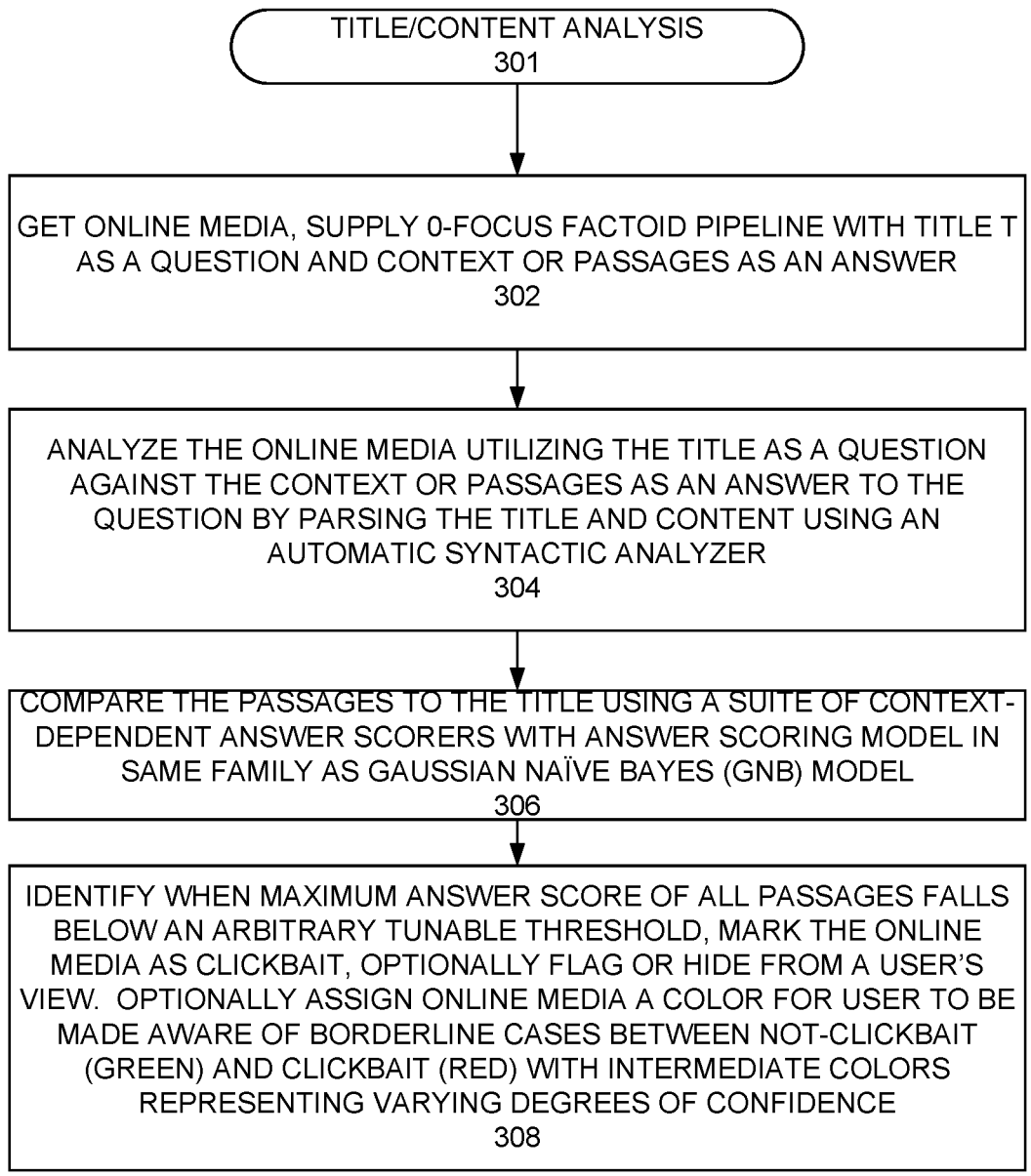

Referring to FIGS. 2 and 3, there are shown respective example system operations generally designated by the reference characters 200, and 300 of computer system 102 of FIG. 1, for implementing misleading title identification in accordance with preferred embodiments.

Referring to FIG. 2, system operations 200 to implement misleading title identification start at a block 201 with receiving online media such as an article having title (question) and body (passages). As indicated at a block 202, online media is applied to N-focus (0-focus) answer scorers, such as Skip-Ngram, a semantic pattern matcher, and the like. As indicated at a block 204, feature values are identified and applied to an answer scoring model, such as Gaussian Naïve Bayes (Gaussian NB), maximum entropy, or other real-valued scoring model as indicated at a block 206. As indicated at a block 208, a score is identified. As indicated at a decision block 210, checking whether the score is less than a predefined threshold is performed. When the score is less than the predefined threshold, then the title is marked as clickbait as indicated at a block 212. Otherwise when the score is not less than the predefined threshold, then no action is needed as indicated at a block 214.

Referring to FIG. 3, system operations 300 to implement misleading title identification with title and content analysis start at a block 301. Online media is received, and title T as a question is supplied to a 0-focus factoid pipeline as indicated at a block 302. As indicated at a block 304, utilizing the title as a question and content as an answer to the question to form a title accuracy assessment by parsing the title and content using an automatic syntactic analyzer, such as a Slot Grammar (XSG) parser, such as a natural language parser (NLP), the Stanford NLP Group, or other automatic syntactic analyzer.

As indicated at a block 306, the passages are compared to the title using a suite of context-dependent answer scorers with answer scoring model in a same family as Gaussian Naïve Bayes (GBN) model. As indicated at a block 308, when a maximum answer score of all passages is identified below an arbitrary tunable threshold, the online media is marked as clickbait, or optionally is flagged or hidden from a user's view. At block 308, optionally the online media is assigned a color for the user to be made aware of borderline cases between not-clickbait (green) and clickbait (red) with intermediate colors representing varying degrees of confidence.

Figure 4:
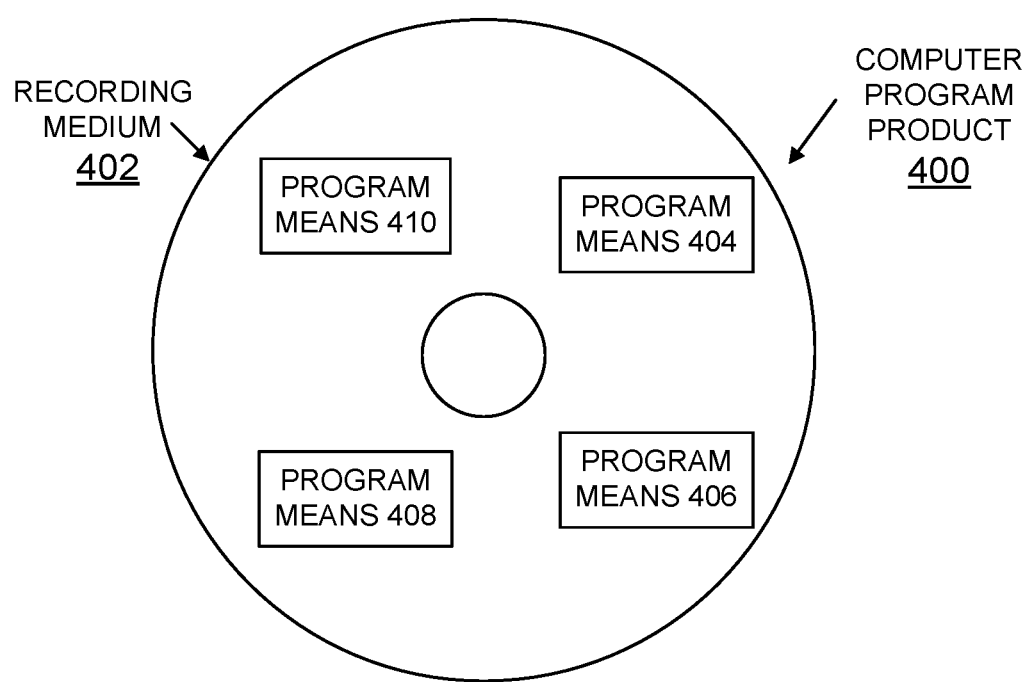
FIG. 4 is a block diagram illustrating a computer program product in accordance with the preferred embodiment.

Referring now to FIG. 4, an article of manufacture or a computer program product 400 of the invention is illustrated. The computer program product 400 is tangibly embodied on a non-transitory computer readable storage medium that includes a recording medium 402, such as, a floppy disk, a high capacity read only memory in the form of an optically read compact disk or CD-ROM, a tape, or another similar computer program product. The computer readable storage medium 402, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Recording medium 402 stores program means or instructions 404, 406, 408, and 410 on the non-transitory computer readable storage medium 402 for carrying out the methods for implementing misleading title identification in the system 100 of FIG. 1.

Computer readable program instructions 404, 406, 408, and 410 described herein can be downloaded to respective computing/processing devices from a computer readable storage medium or to an external computer or external storage device via a network, for example, the Internet, a local area network, a wide area network and/or a wireless network. The computer program product 400 may include cloud-based software residing as a cloud application, commonly referred to by the acronym (SaaS) Software as a Service. The network may comprise copper transmission cables, optical transmission fibers, wireless transmission, routers, firewalls, switches, gateway computers and/or edge servers. A network adapter card or network interface in each computing/processing device receives computer readable program instructions 404, 406, 408, and 410 from the network and forwards the computer readable program instructions for storage in a computer readable storage medium within the respective computing/processing device.

A sequence of program instructions or a logical assembly of one or more interrelated modules defined by the recorded program means 404, 406, 408, and 410, direct the system 100 for implementing misleading title identification of the preferred embodiment.

While the present invention has been described with reference to the details of the embodiments of the invention shown in the drawing, these details are not intended to limit the scope of the invention as claimed in the appended claims.

What is claimed is:

1. A system for implementing title identification with misleading statements comprising:
    a misleading title identification control logic;
    said misleading title identification control logic and a tunable threshold and selected output result tangibly embodied in a non-transitory machine readable medium used to implement title identification with misleading statements;
    said misleading title identification control logic, receiving a title and a list of passages;
    said misleading title identification control logic, supplying the title as a question to a question answering pipeline system, and analyzing the title against the list of passages as an answer source material;
    said misleading title identification control logic, comparing a respective answer score of all passages with a tunable threshold to identify titles that are misleading, providing a selected action for a user for identified misleading titles, and providing a title accuracy assessment utilizing a 0-focus case of a multi-focus factoid pipeline.

2. The system as recited in claim 1, includes said misleading title identification control logic, providing the title accuracy assessment to a user with an indication of the assessment.

3. The system as recited in claim 1, wherein said misleading title identification control logic, providing a selected action for a user includes marking the title as clickbait.

4. The system as recited in claim 1, wherein said misleading title identification control logic, providing a selected action for a user includes flagging the title by an assigned color, one said assigned color representing not clickbait, and one said assigned color representing clickbait.

5. The system as recited in claim 1, wherein said misleading title identification control logic, providing a selected action for a user includes hiding the title from a user's view.

6. The system as recited in claim 1, includes said misleading title identification control logic, comparing passages to the title using a suite of context-dependent answer scorers with an answer scoring model.

7. The system as recited in claim 6, wherein said answer scoring model includes said answer scoring model in a same family as Gaussian Nave Bayes (GBN) model.

8. The system as recited in claim 1, includes said misleading title identification control logic, identifying and applying feature values a real-valued answer scoring model in a family of a Gaussian Naïve Bayes (GBN) model.

9. The system as recited in claim 1, includes said misleading title identification control logic, parsing the title and the list of passages using an automatic syntactic parser including a Slot Grammar (XSG) parser.

10. The system as recited in claim 1, includes said misleading title identification control logic, parsing the title and the list of passages using a natural language parser (NLP).

11. A method for implementing misleading title identification comprising:
providing a misleading title identification control logic;
said misleading title identification control logic and a tunable threshold and selected output result tangibly embodied in a non-transitory machine readable medium implement title identification with misleading statements comprising:
receiving a title and a list of passages;
supplying the title as a question to a question answering pipeline system, and analyzing the title against the list of passages as an answer source material,
wherein analyzing the title against the list of passages utilizes a 0-focus case of a multi-focus factoid pipeline system; and
comparing a respective answer score of all passages with a tunable threshold to identify titles that are misleading, and providing a selected action for a user for identified misleading titles.

12. The method as recited in claim 11, includes parsing the title and the list of passages using a natural language parser (NLP).

13. The method as recited in claim 11, includes parsing the title and the list of passages using an automatic syntactic parser including a Slot Grammar (XSG) parser.

14. The method as recited in claim 11, includes identifying and applying feature values to a real-valued answer scoring model in a family of a Gaussian Naïve Bayes (GBN) model.

15. The method as recited in claim 11, wherein the selected action is selected from the group consisting of marking the title as clickbait, flagging the title by an assigned color, and hiding the title from a user's view.

16. The method as recited in claim 11, includes comparing passages to the title using a suite of context-dependent answer scorers with an answer scoring model.

* * * * *